(12) United States Patent
Rasmussen

(10) Patent No.: US 7,773,696 B1
(45) Date of Patent: Aug. 10, 2010

(54) QBL-MSK MAPPING FOR TIME OF ARRIVAL (TOA) APPLICATIONS

(75) Inventor: Donald John Rasmussen, Fort Wayne, IN (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 900 days.

(21) Appl. No.: 11/644,144

(22) Filed: Dec. 22, 2006

(51) Int. Cl.
*H04L 27/12* (2006.01)

(52) U.S. Cl. .................. 375/305; 375/146; 375/219; 375/274

(58) Field of Classification Search .......... 375/140, 375/141, 146, 219, 222, 260, 261, 269, 274, 375/295, 298, 305
See application file for complete search history.

(56) References Cited

U.S. PATENT DOCUMENTS

| | | | |
|---|---|---|---|
| 5,764,686 A * | 6/1998 | Sanderford et al. | 375/149 |
| 5,818,867 A | 10/1998 | Rasmussen et al. | |
| 6,687,507 B2 * | 2/2004 | Fischer et al. | 455/456.6 |
| 7,366,243 B1 * | 4/2008 | McCrady | 375/259 |
| 2003/0012266 A1 * | 1/2003 | Gilmour et al. | 375/148 |

\* cited by examiner

*Primary Examiner*—Dac V Ha
(74) *Attorney, Agent, or Firm*—RatnerPrestia

(57) ABSTRACT

A transmitter is configured to transmit a time of arrival (TOA) message to a receiver applying a quadrature multiple frequency ranging (QMFR) algorithm for separating multiple path signal components. The transmitter includes (1) a modulator for generating a quasi-band limited minimum shift keyed (QBL-MSK) signal, (2) a serial formatter for generating a serial QBL-MSK (SQBL-MSK) signal, and (3) a switch for disabling the serial formatter, during a time that the TOA message is being transmitted to the receiver. The receiver includes (1) a matched filter for separating a data packet with the TOA message into in-phase (I) and quadrature (Q) spreading sequences, (2) an even sample mapping section, coupled to the matched filter, for outputting the even samples of the I and Q spreading sequences, (3) an odd sample mapping section, coupled to the matched filter, for outputting the odd samples of the I and Q spreading sequences, and (4) sliding correlator banks for receiving the even samples of the I and Q spreading sequences and the odd samples of the I and Q spreading sequences and outputting despread even I and Q samples and despread odd I and Q samples to a QMFR algorithm for separating multiple path signal components.

7 Claims, 10 Drawing Sheets

FIG. 3a
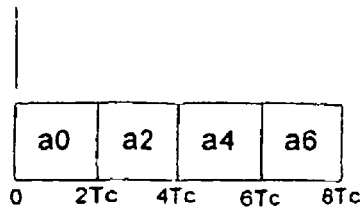
FIG. 3b
FIG. 4a
FIG. 4b
FIG. 4c
FIG. 4d
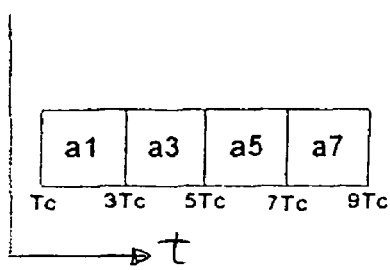

FIG. 11

QBL-MSK MAPPING FOR TIME OF ARRIVAL (TOA) APPLICATIONS

TECHNICAL FIELD

The present invention relates, in general, to spread spectrum communication systems. More specifically, the invention applies quasi-band limited minimum shift keying (QBL-MSK) mapping techniques during a time of arrival (TOA) message, so that a quadrature multiple frequency ranging (QMFR) receiver may separate multiple path signal components. For other messages within a data packet, the invention applies serial QBL-MSK (SQBL-MSK) formatting techniques.

BACKGROUND OF THE INVENTION

Spread spectrum communications involves spreading the transmitted signal energy over a wide bandwidth utilizing a spreading function which is known at both the transmitter and receiver. The spreading function is typically defined by a binary sequence which is usually pseudo randomly generated. These sequences are often referred to as the chip sequences, which include binary symbols referred to as chips.

A common spread spectrum technique is known as direct sequence spreading. Direct sequence spreading includes directly multiplying a conventional narrow band signal by the chip sequence, where the chip rate is higher than the data rate.

Pulse shaping techniques are utilized in spread spectrum systems in order to improve the modular spectral efficiency and minimize adjacent channel interference. Quasi band-limited minimum shift keying (QBL-MSK) is a pulse shaping technique which provides a significant improvement in modulator spectral efficiency over standard minimum shift keying (MSK) techniques, when operated with a linear power amplifier.

QBL-MSK pulse shaping is applied to spread spectrum radios by utilizing a binary phase shift keying (BPSK) technique to convey the data information. By utilizing BPSK data modulation, the QBL-MSK waveform structure is unmodified. This enables the advantages provided by the QBL-MSK pulse shaping to be directly applied to the spread spectrum signal.

A technique known as quadrature phase shift keying (QPSK) is utilized to increase the data capability of a spread spectrum signal generated by QBL-MSK modulation. Utilizing the QPSK technique results in the data rate being increased by a factor of two.

U.S. application Ser. No. 11/314,757, filed on Dec. 21, 2005 by the same inventor of the present application, discloses a serial quasi-band-limited minimum shift keying (SQBL-MSK) modulation waveform. The SQBL-MSK waveform enables a serial correlation structure to be used, with an in-phase (I) and quadrature (Q) correlator using the same synchronization (SYNC) sequence. Standard parallel QBL-MSK uses a four correlator structure based on the even and odd symbols on the I and Q sequence. The serial correlation structure used for synchronization (SYNC) detection provides a simplified binary phase shift keying (BPSK) correlation operation versus a parallel structure. This reduces the complexity of the SYNC operation.

To simplify the SYNC operation, serial formatting is applied to quadrature pulse-shaped signals. This is implemented by adding a serial formatting term to the modulation waveform, which multiplies a nonreturn to zero (NRZ) symbol sequence with a repetitive 1, 1, −1, −1 sequence. For SQBL-MSK, the modulation waveform for the SYNC portion of the waveform may be written as follows:

$$s(t) = \left[\sum_{i=0}^{M-1} (-1)^i c_{2i} \cdot p(t - 2iT_s)\right]\cos(2\pi f_o t) + \left[\sum_{i=0}^{M-1} (-1)^i c_{2i+1} \cdot p(t - [2i+1]T_s)\right]\sin(2\pi f_o t)$$

and $$p(t) = \begin{cases} \left[\dfrac{\sin\left(\dfrac{\pi t}{2T_s}\right)}{\left(\dfrac{\pi t}{2T_s}\right)}\right]^3; & -2T_s \leq t \leq 2T_s \\ 0; & \text{elsewhere.} \end{cases}$$

For the data modulated SQBL-MSK waveform equation given above, $T_s$ represents the symbol period, $c_i$ represents the SYNC symbols at time $iT_s$, 2M is the number of symbols in the SYNC sequence, p(t) is the QBL pulse-shaping function, $f_o$, is the carrier center frequency, and the $(-1)^i$ terms which multiplies the symbol value represents the serial formatting. For 128 symbol SYNC, for example, M is equal to 64. The SYNC symbols ($c_i$) take on either a +1 or −1 value.

During communications between one node (receiver and transmitter system) and another node, data packets may be transmitted and received. These data packets may include various messages used for different purposes. For example, the data packet may include a power amplifier (PA) ramp up message, an automatic gain control (AGC) acquisition message, multipath (MP) window message, a SYNC message, a time of arrival (TOA) message, a data message and a (PA) ramp down message. The TOA message may be used by a quadrature multiple frequency ranging (QMFR) module of a receiver to separate multiple path signal components between a transmitter of one node and a receiver of another node.

A QMFR module, or QMFR processor, that receives the TOA message and executes an algorithm to separate multiple path signal components requires that the sliding correlation output for zero phase error should be only on the I correlation output and not on the Q correlation output. This requirement cannot be met when using SQBL-MSK modulation.

Furthermore, conventional QBL-MSK modulation of a signal provides both an I and Q correlation output. The isolation of the correlation output to either the I or Q side is required to implement the QMFR algorithm. The QBL-MSK modulated signal must, therefore, be reformatted in order to implement the QMFR algorithm.

The present invention addresses, among other things, an advantageous communication system and method of (1) using QBL-MSK modulation for implementing the QMFR algorithm during the TOA message portion of the data packet, and (2) using SQBL-MSK modulation for processing other portions (for example SYNC message or data message) of the data packet.

SUMMARY OF THE INVENTION

To meet this and other needs, and in view of its purposes, the present invention provides a transmitter configured to transmit a time of arrival (TOA) message to a receiver applying a quadrature multiple frequency ranging (QMFR) algorithm for separating multiple path signal components. The transmitter includes (1) a modulator for applying a spreading sequence to the TOA message to generate a quasi-band limited minimum shift keying (QBL-MSK) signal, (2) a serial formatter for applying a serial formatting operation to the QBL-MSK signal to generate a serial quasi-band limited minimum shift keying (SQBL-MSK) signal, and (3) a switch for disabling the serial formatter, during the time that the TOA message is being transmitted to the receiver.

The transmitter also includes a transmitter section for transmitting the SQBL-MSK signal or the QBL-MSK signal. The switch includes a processing module for enabling or disabling the serial formatter, where when the switch enables the serial formatter, the transmitter section is configured to transmit the SQBL-MSK signal, and when the switch disables the serial formatter, the transmitter section is configured to transmit the QBL-MSK signal.

The switch is configured for disabling the serial formatter during the time that the TOA message, or a power amplifier (PA) ramp down message is being transmitted to the receiver. The switch is also configured for enabling the serial formatter during the time that a PA ramp up message, an automatic gain control (AGC) message, a multipath window message, a synchronization (SYNC) message, or a data message is being transmitted to the receiver.

Another embodiment of the invention includes a receiver configured to apply a quadrature multiple frequency ranging (QMFR) algorithm for separating multiple path signal components. The receiver includes (1) a receiver section configured to receive a data packet including a time of arrival (TOA) message, (2) a matched filter for separating the data packet into in-phase (I) and quadrature (Q) spreading sequences, each sequence having even and old samples, (3) an even sample mapping section, coupled to the matched filter, for outputting the even samples of the I and Q spreading sequences, (4) an odd sample mapping section, coupled to the matched filter, for outputting the odd samples of the I and Q spreading sequences, and (5) even and odd sliding correlator banks for receiving, respectively, the even samples of the I and Q spreading sequences and the odd samples of the I and Q spreading sequences and outputting, respectively, despread even I and Q samples and despread odd I and Q samples to the QMFR algorithm for separating multiple path signal components.

The data packet includes a synchronization (SYNC) message and a TOA message. The SYNC message includes SQBL-MSK modulation and the TOA message includes QBL-MSK modulation. The receiver further includes a phase rotator, coupled to the matched filter, for generating serial I and Q signals based on the SQBL modulation. The even and odd sliding correlator banks are coupled to the matched filter for generating the despread even I and Q samples and the despread odd I and Q samples, based on the QBL-MSK modulation. The phase rotator and the even and odd sliding correlator banks are each coupled to the same matched filter.

Yet another embodiment of the invention is a method of separating multiple path signal components between a receiver and a transmitter. The method includes the steps of (a) modulating, by a transmitter, a data packet including a time of arrival (TOA) message using a spreading sequence; (b) formatting, by the transmitter, the TOA message using QBL-MSK modulation; (c) formatting, by the transmitter, other portions of the data packet using SQBL-MSK modulation; and (d) transmitting the TOA message modulated by QBL-MSK and the other portions of the data packet modulated by SQBL-MSK. The TOA message is configured for a receiver to separate multiple path signal components.

The method also includes the step of switching a serial formatter ON/OFF to enable or disable the serial formatter. When the serial formatter is switched OFF, the TOA message is modulated by QBL-MSK; and when the serial formatter is switched ON, the other portions of the data packet are modulated by SQBL-MSK. The step of formatting the other portions of the data packet includes formatting a PA ramp up message, an automatic gain control (AGC) message, a multipath window message, a SYNC message, or a data message using SQBL-MSK modulation.

Still another embodiment of the invention includes a method of separating multiple path signal components between a receiver and a transmitter. The method has the steps of: (a) receiving a data packet including a time of arrival (TOA) message having a spreading sequence; (b) separating the data packet including the TOA message, using a matched filter, into in-phase (I) and quadrature (Q) spreading sequences, each sequence having even and odd samples; (c) separating, for the TOA message, the even samples of the I and Q spreading sequences from the odd samples of the I and Q spreading sequences; (d) despreading the separated even samples and the odd samples of step (c); and (e) sending the despread I and Q even samples and the despread I and Q odd samples of step (d) to a module configured to execute a QMFR algorithm for separating multiple path signal components.

Step (a) includes receiving the TOA message formatted with QBL-MSK modulation, and receiving other portions of the data packet formatted with SQBL-MSK modulation. Receiving the other portions of the data packet includes receiving a PA ramp up message, an automatic gain control (AGC) message, a multipath window message, a SYNC message, or a data message, each formatted with SQBL-MSK modulation.

Step (b) includes separating the TOA message formatted with QBL-MSK modulation and the other portions of the data packet formatted with SQBL-MSK modulation into I and Q spreading sequences using the same matched filter.

The method further includes the steps of: (f) phase rotating the other portions of the data packet formatted with SQBL-MSK modulation; and (g) bypassing step (f) for the TOA message formatted with QBL-MSK modulation.

Step (d) includes using even I and Q correlator banks to obtain the despread I and Q even samples, and using odd I and Q correlator banks to obtain the despread I and Q odd samples.

It is understood that the foregoing general description and the following detailed description are exemplary, but are not restrictive, of the invention.

BRIEF DESCRIPTION OF THE DRAWING

The invention is best understood from the following detailed description when read in connection with the accompanying drawing. Included in the drawing are the following figures:

FIGS. 3a and 3b are timing diagrams showing the formatting of the even and odd chip periods for the SQBL-MSK and QBL-MSK modulations;

FIGS. 4a-4d are timing diagrams showing the output signals from the even I and Q sliding collelator banks and the odd I and Q sliding collelator banks, in accordance with an embodiment of the present invention;

FIG. 11 is a detailed waveform structure diagram of the TOA messages shown in FIG. 10, in accordance with an embodiment of the present invention.

DETAILED DESCRIPTION OF THE INVENTION

Figure 1:
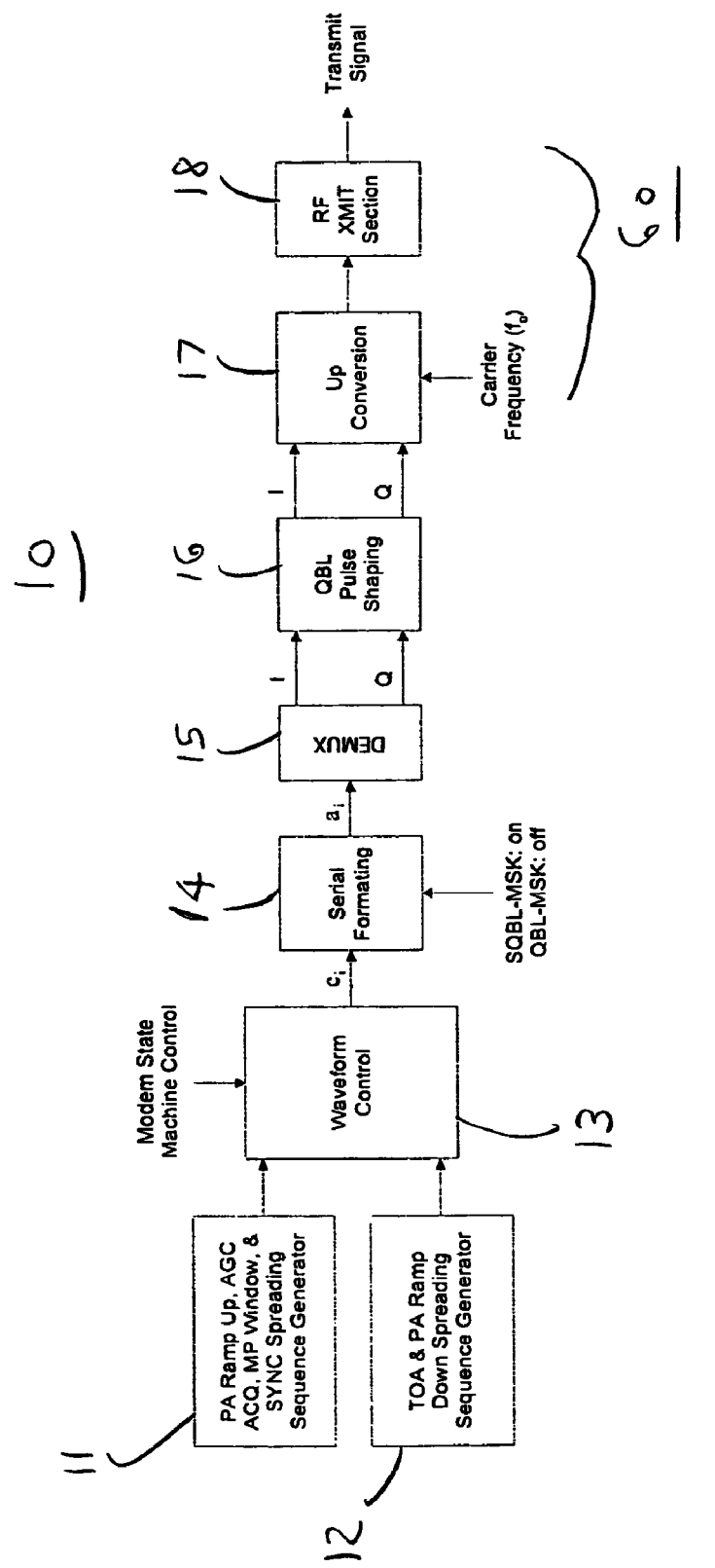
FIG. 1 is a block diagram of a transmitter system for transmitting either SQBL-MSK or QBL-MSK, in accordance with an embodiment of the present invention.

Proper construction of a quasi-band limited minimum shift keying (QBL-MSK) signal is important to the implementation of the time of arrival (TOA) message. By providing a mapping technique, in accordance with an embodiment of the present invention, for QBL-MSK signaling, instead of serial QBL-MSK (SQBL-MSK) signaling, the sliding correlation output for zero phase error is only on the I correlation output and not on the Q correlation output. For SQBL-MSK with zero phase error, an I and Q correlation output are generated. The QBL-MSK signal provides an I and Q correlation output, similar to the one obtained using an existing QBL-BPSK TOA message. The isolation of the correlation output to either the I or Q side is required to implement the quadrature multiple-frequency ranging (QMFR) algorithm, which is used for fine TOA resolution and multi-path isolation within a half of a chip period.

By using the QBL-MSK signal, instead of the QBL-BPSK signal, the power spectrum sidelobe re-growth is significantly reduced, when the power amplifier is operated at or near saturation. Since power efficiency is significant to many operational modes, along with maximum power operation for signal penetration into buildings, QBL-MSK is superior over QBL-BPSK.

The QBL-MSK formatting requires minimal design change in the modulator and demodulator. In the modulator, the serial formatting algorithm is turned OFF, and in the demodulator the phase rotator is also turned OFF. The same sliding correlation approach used for QBL-BPSK despreading is used for the QBL-MSK despreading, except that the TOA spreading code operates at twice the chip rate. To use the same sliding correlator, the received I and Q signals are mapped into the sliding correlator using an algorithm, in accordance with an embodiment of the present invention.

As will be explained, by reference to FIG. 1, the present invention includes a transmitter for transmitting a data packet including a TOA message to a receiver. In turn, the receiver applies a QMFR algorithm for separating multiple path signal components. As shown, transmitter 10 includes spreading sequence generators 11 and 12 being controlled by weight form controller 13 to output different chip values, denoted as $c_i$. Serial formatter 14 provides a serially formatted signal, denoted as $a_i$. This serially formatted signal is B multiplexed by the multiplexer 15 to produce the I and Q wave forms. QBL pulls shaper 16 multiplies the I and Q wave forms to produce the QBL pulse shaped I and Q wave forms. These signals are mixed in up conversion module 17 by a carrier frequency $f_o$, and transmitted as an output signal by RF (transmitter section 18).

Figure 6B:
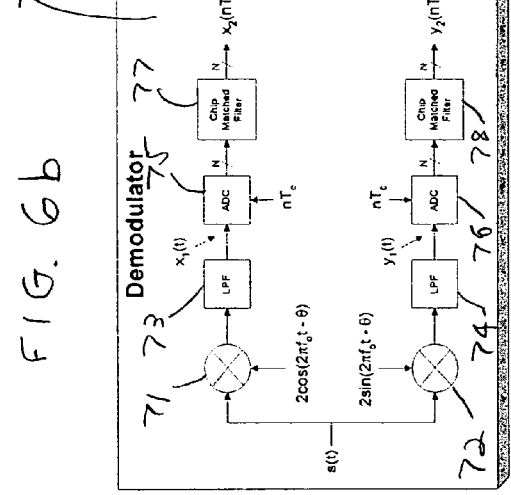
FIG. 6b is a block diagram of a demodulator forming a portion of the receiver system of FIG. 5.
Figure 6A:
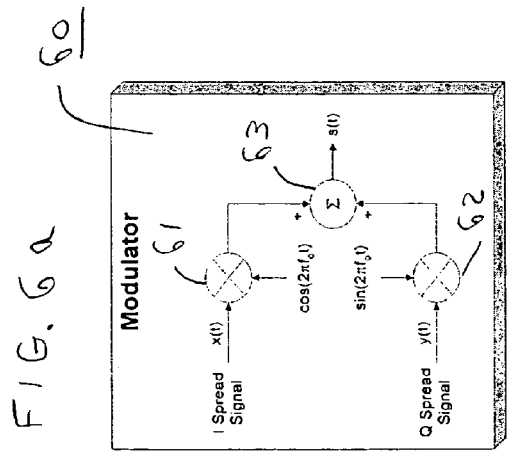
FIG. 6a is a block diagram of a modulator forming a portion of the transmitter system of FIG. 1.

The up converter 17 and the RF transmitter section 18 are also shown in greater detail in FIG. 6a, generally being designated as 60.

Still referring to FIG. 1, serial formatter 14 is either turn ON or OFF to generate SQBL-MSK or QBL-MSK, respectively. In one implementation, when the PA ramp up message, the AGC acquisition message, the MP window message, or the SYNC message is being modulated by spreading sequence generator 11, serial formatter 14 is turned ON. The serial formatting of these messages produces the SQBL-MSK waveform, ai. On the other hand, when the TOA message, or PA ramp down message is being modulated by spreading sequence generator 12, serial formatter 14 is turned OFF. When turned OFF, these messages are formatted with the QBL-MSK waveform, ai.

The signal structure to produce the transmit signal of transmitter 10 will now be described in greater detail. For notation purposes, the conventional QBL-MSK modulation signal is represented by QBL-MSK, while the SQBL-MSK modulation signal is represented by SQBL-MSK. For the power amplifier (PA) ramp up, AGC acquisition, SYNC detection, and multi-path (MP) window messages, the SQBL-MSK formatting is used. The QBL-MSK signal is used for the TOA sequence detection and PA ramp down messages of the data packet.

It will be appreciated, however, that if the data message is sequenced between the TOA message and the PA ramp down message, then the SQBL-MSK formatting is used for both the TOA and PA ramp down messages.

The TOA message uses a random spreading sequence having good autocorrelation properties to estimate the correlation response of the message. By applying curve fitting to the estimated correlation response, a finer time-of-arrival estimation may be obtained.

A general modulation structure for both QBL-MSK and SQBL-MSK signals is given by the following equation:

$$s(t) = \left[\sum_{i=0}^{M} f(i) \cdot c_{2i} \cdot p(t - 2iT_c)\right]$$

$$\cos(2\pi f_o t) + \left[\sum_{i=0}^{M} f(i) \cdot c_{2i+1} \cdot p(t - [2i+1]T_c)\right] \sin(2\pi f_o t)$$

and $$p(t) = \begin{cases} \left[\dfrac{\sin\left(\dfrac{\pi t}{2T_c}\right)}{\left(\dfrac{\pi t}{2T_c}\right)}\right]^3; & -2T_c \leq t \leq 2T_c \\ 0; & \text{elsewhere.} \end{cases}$$

For the general QBL-MSK waveform equation given above, $T_c$ represents the chip period, $c_i$ represents the chip value at time $iT_c$, (M+1) is the number of chips in the modulated signal, p(t) is the QBL pulse-shaping function, and $f_o$ is the carrier center frequency. A chip $c_i$ takes on either a +1 or −1 value by mapping a logic 0 to a +1 value and a logic 1 to a −1 value from the output signal of the spreading sequence generator.

Figure 2:
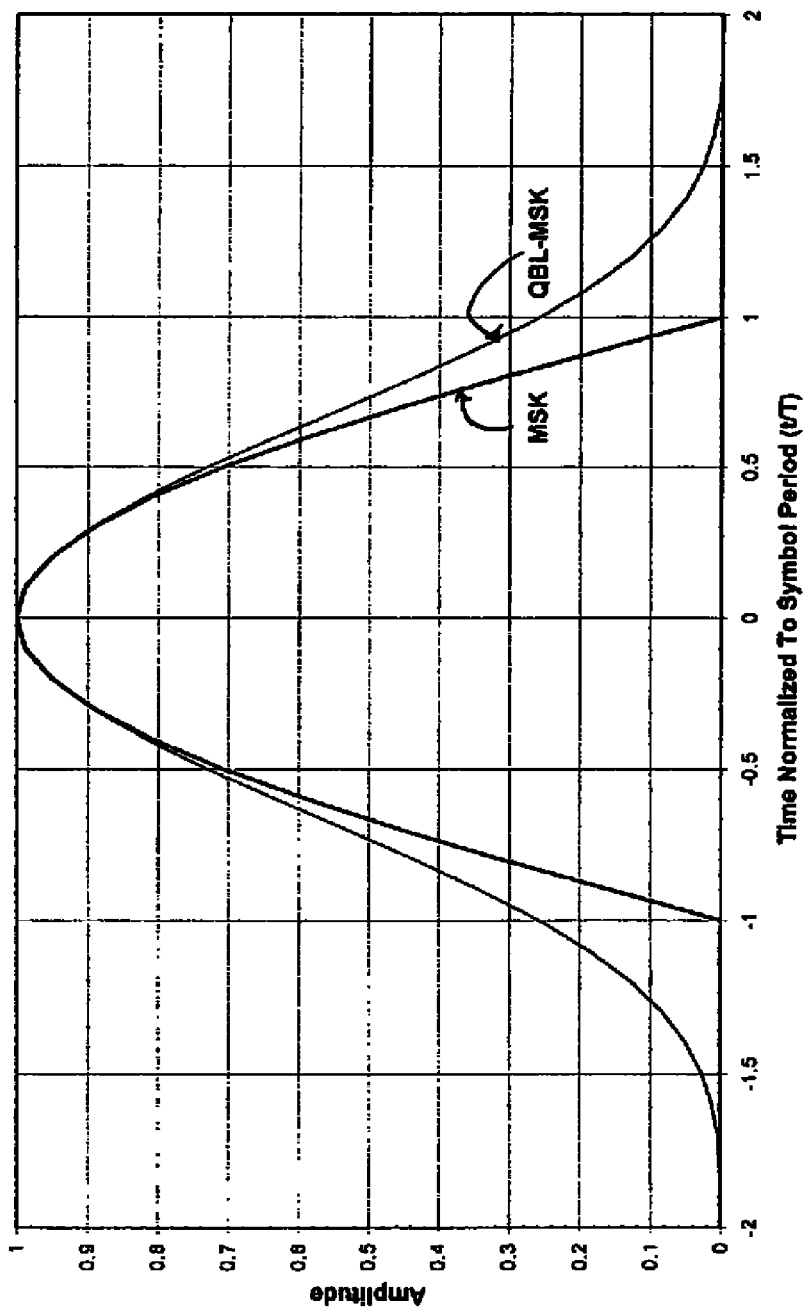
FIG. 2 is a plot of a QBL-MSK pulse shaping function which is compared to a MSK pulse shaping function.

The QBL pulse-shaping function as compared to a MSK pulse-shaping function is shown in FIG. 2. The difference between the QBL-MSK and the SQBL-MSK to signal is determined by the f(i) function given in the equation above. This function is defined as follows for the different QBL-MSK signals:

$$f(i) = \begin{cases} (-1)^i; & \text{for } SQBL-MSK \\ 1; & \text{for } QBL-MSK. \end{cases}$$

For SQBL-MSK, the f(i) function is referred to as the serial formatting operation. This operation is typically applied to the spreading sequence. For QBL-MSK, the serial formatting operation is simply turned OFF.

The I and Q signals, denoted as ai, for the SQBL-MSK AND QBL-MSK modulation are shown in FIGS. 3a and 3b, respectively. The Tc represents the chip period.

Figure 5:
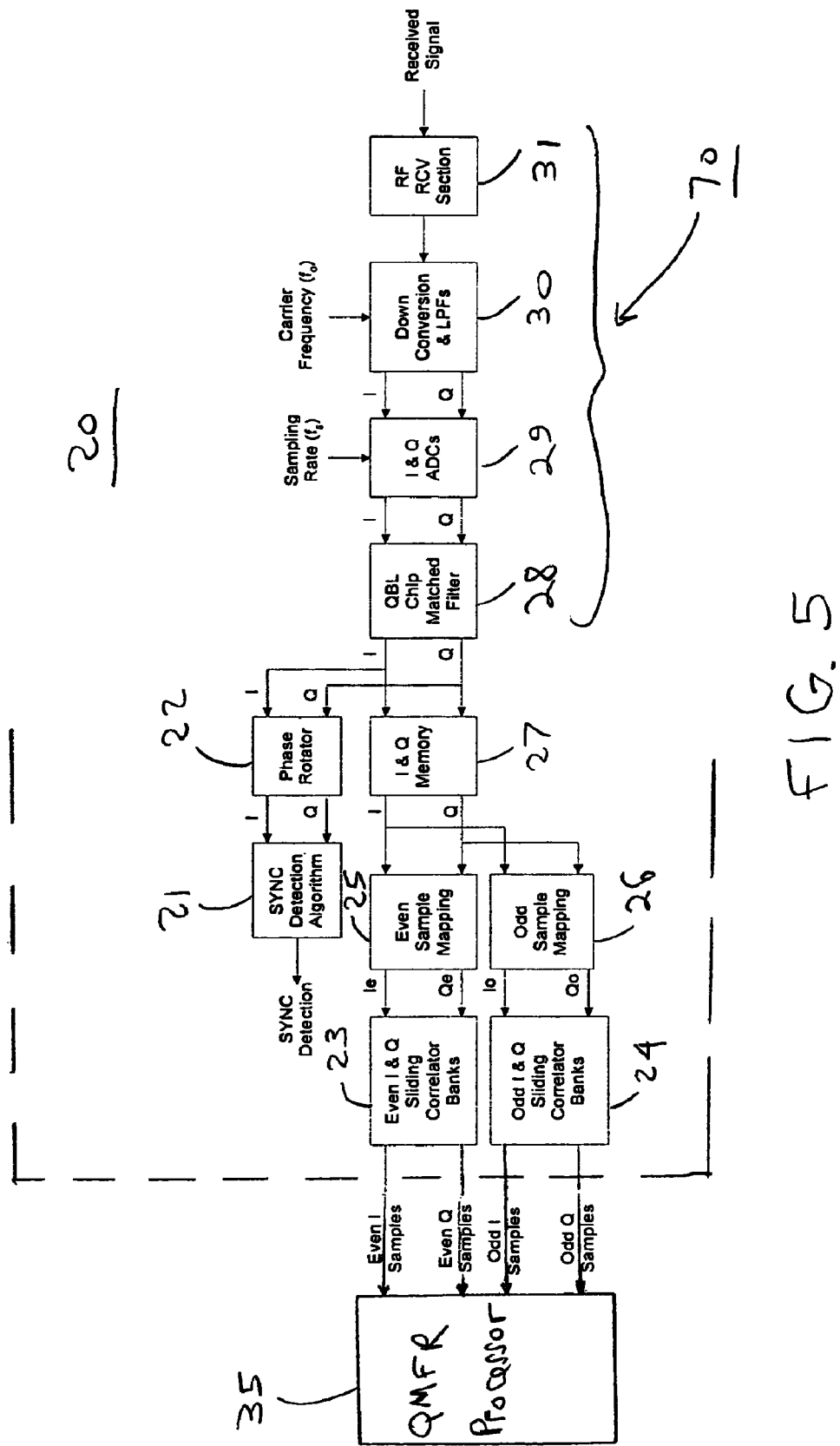
FIG. 5 is a block diagram of a receiver system formatting received signals for use by a QMFR processor for separating multiple path signal components, in accordance with an embodiment of the present invention.

Referring next to FIG. 5, there is shown a receiver system, generally designated as 20. Viewing the figure from right to left, the demodulator section is generally designated as 70 and includes RF receiver section 31, down converter and low pass filter (LPF) section 30, I and Q analog to digital converters (ADCs) 29, and chip matched filters 28. In the demodulator section, the same structure is used for SQBL-MSK and QBL-MSK between receiver input section 31 and chip matched filters 28.

The SQBL-MSK is used to achieve synchronization for the data packet, which requires a phase rotator algorithm before the SYNC detection algorithm. The phase rotator is shown designated as 22 and the SYNC detection algorithm is shown designated as 21. Once SYNC detection is established by module 21, the sliding correlation process is started based on the timing established by the SYNC detection module. The I and Q memory 27 is provided in the chain after chip matched filters 28 to account for the delay in the SYNC detection algorithm and allow the sliding correlation process to begin a fixed number of chips before the SYNC detection point.

Following the memory, in sequence, are even and odd sample mapping algorithms (or modules), designated as 25 and 26, respectively. These mapping modules allow a single I and Q correlator structure to be implemented. Even and odd samples from chip matched filters 28 are provided to the appropriate correlator structure. As shown, the even I and Q samples are mapped to the even I and Q sliding correlator banks, generally designated as 23. Similarly, the odd I and Q samples are mapped to the odd I and Q sliding correlator banks, generally designated as 24. Having now been separated, the even I and Q samples and the odd I and Q samples are provided to the QMFR processor (or algorithm) for separating multiple path signal component. The QMFR processor is shown as 35.

The input signals to the QMFR processor of even I and Q samples are shown in FIGS. 4a and 4b. The input signals to the QMFR processor of odd I and Q samples are shown in FIGS. 4c and 4d. It is noted that the I samples when mapped into the Q samples have their respective sign inverted (+ to −; − to +).

It will now be appreciated that one of the advantages of the invention is the ability to use the same receiver front-end for reception of both signals, the QBL-MSK signal and SQBL-MSK signal.

The embodiment shown in FIG. 5 assumes an analog down-converter implementation. The received I and Q signals are outputted from ADCs 29 as digital samples and filtered by chip matched filters 28. It will be appreciated that equivalent equations can be obtained using IF sampling combined with a digital down-converter. Equations for the received I and Q signals may be determined based on modulator 60 shown in FIG. 6a and demodulator 70 shown in FIG. 6b.

The modulator section 60, which is shown in FIG. 1 and, with greater detail, in FIG. 6a, includes mixers 61 and 62, each providing a spread signal to summer 63 to produce transmitted signal s(t).

The demodulator section 70, which is shown in FIG. 5 and, with greater detail, in FIG. 6b, includes mixers 71 and 72 receiving signal s(t). Each demodulated signal from mixers 71, 72 is low pass filtered (by LPF 73, 74), digitally sampled (by ADC 75, 76) and match filtered (by chip matched filters 77, 78) to produce $x_2$ and $y_2$ as the demodulated I and Q signals.

The resulting equations for the sampled $I\{x_2(n)\}$ and $Q\{y_2(n)\}$ signals out of the chip matched filters are as follows:

$$x_2(n) = \left[\sum_{i=0}^{M} f(i) \cdot c_{2i} \cdot g([n-2i]T_c + \Delta T_c)\right] \cos(\theta) + \left[\sum_{i=0}^{M} f(i) \cdot c_{2i+1} \cdot g([n-2i-1]T_c + \Delta T_c)\right] \sin(\theta)$$

and $$y_2(n) = -\left[\sum_{i=0}^{M} f(i) \cdot c_{2i} \cdot g([n-2i]T_c + \Delta T_c)\right] \sin(\theta) + \left[\sum_{i=0}^{M} f(i) \cdot c_{2i+1} \cdot g([n-2i-1]T_c + \Delta T_c)\right] \cos(\theta).$$

For the I and Q signals out of the chip matched filters, g(t) is the autocorrelation function for the QBL-MSK signal, $\Delta T_C$ is the chip timing error from ideal sampling and θ is the carrier phase error. Since the received signal is sampled at the chip rate, the maximum chip timing error is either plus or minus a half of a chip ($\pm 0.5 \cdot T_C$).

Figure 7:
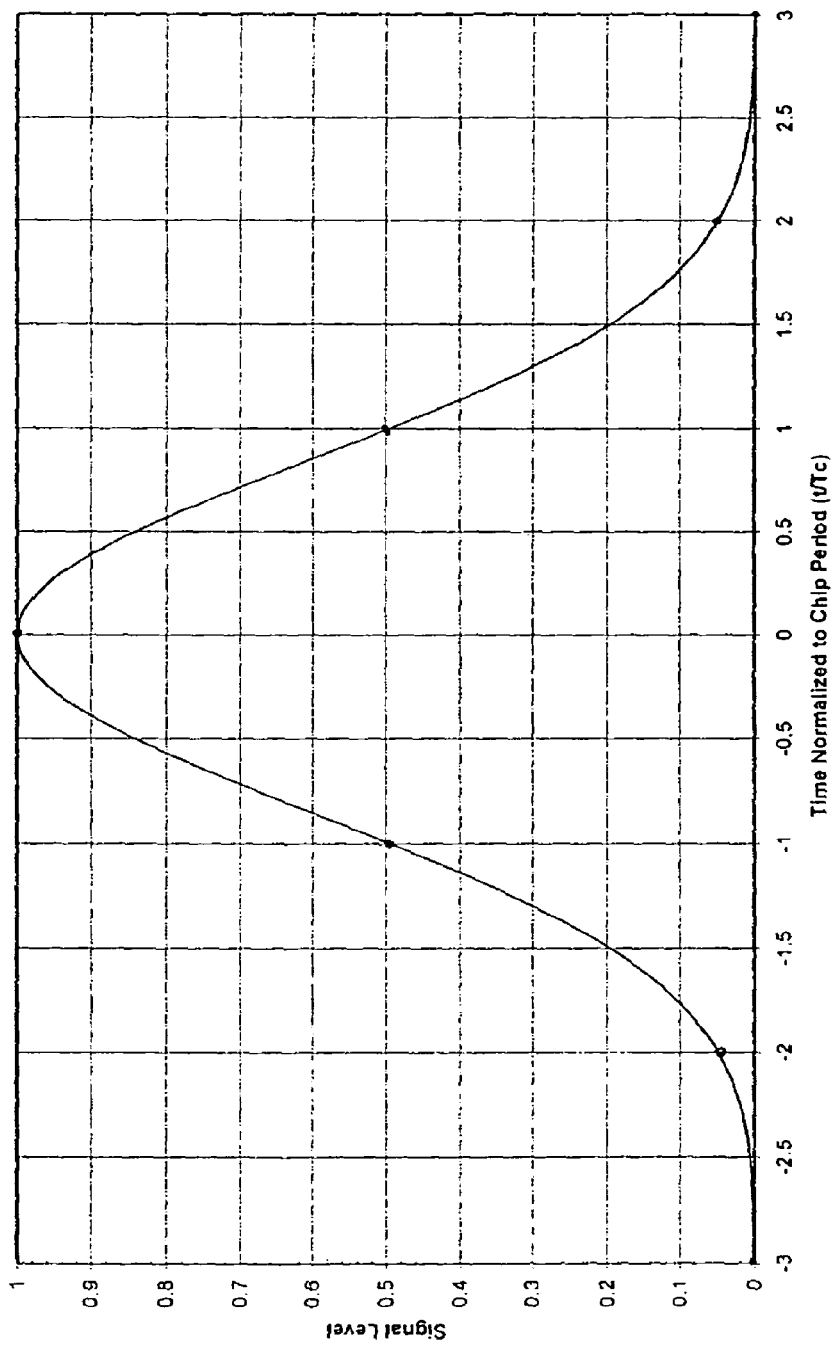
FIG. 7 is a plot of a QBL-MSK autocorrelation function.

The autocorrelation function may be obtained by convolving the QBL pulse-shaping function with itself. A closed form equation for the autocorrelation function does not exist. FIG. 7 shows a plot of the autocorrelation function. The autocorrelation function is nonzero for approximately 2.5 chip periods before and after the autocorrelation function peak.

The details on how the SQBL-MSK demodulator and the QBL-MSK demodulator each processes the I and Q chip matched filter outputs are described separately in the following sections.

SQBL-MSK Demodulation

Figure 8:
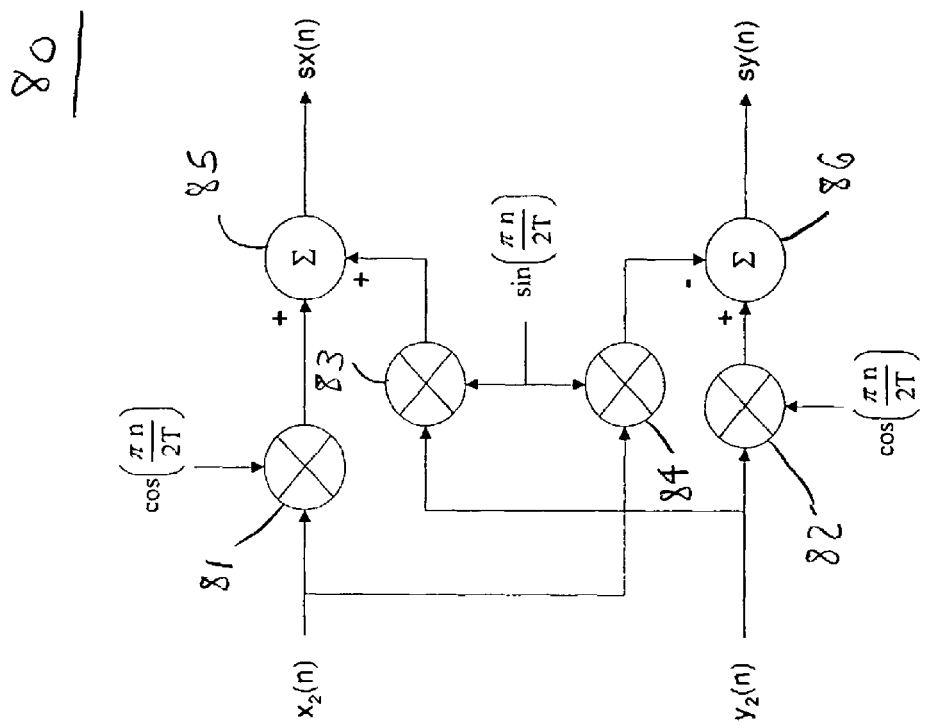
FIG. 8 is a block diagram of a phase rotator used in the receiver system of FIG. 5, in accordance with an embodiment of the present invention.

The serial demodulation technique used to establish synchronization applies a phase rotator algorithm to the I and Q chip matched filter outputs to generate serial I and Q signals. FIG. 8 shows the phase rotator algorithm used to generate the serial I and Q signals. As shown, phase rotator 80 (or phase rotator 22 in FIG. 5) includes mixers 81, 82, 83 and 84, and summers 85 and 86 to provide the serial $I\{sx(n)\}$ output signal and the serial $Q\{sy(n)\}$ output signal.

Equations for the serial I{sx(n)} and serial Q{sy(n)} are defined by the following equations:

$$sx(n) = \cos(\theta)\left[\sum_{i=0}^{M} f(i) \cdot c_{2i} \cdot g([n-2i]T_c + \Delta T_c)\cos\left(\frac{\pi n}{2}\right) + \right.$$

$$\left. \sum_{i=0}^{M} f(i) \cdot c_{2i+1} \cdot g([n-2i-1]T_c + \Delta T_c)\sin\left(\frac{\pi n}{2}\right)\right] +$$

$$\sin(\theta)\left[-\sum_{i=0}^{M} f(i) \cdot c_{2i} \cdot g([n-2i]T_c + \Delta T_c)\sin\left(\frac{\pi n}{2}\right) + \right.$$

$$\left. \sum_{i=0}^{M} f(i) \cdot c_{2i+1} \cdot g([n-2i-1]T_c + \Delta T_c)\cos\left(\frac{\pi n}{2}\right)\right]$$

and $$sy(n) = -\sin(\theta)\left[\sum_{i=0}^{M} f(i) \cdot c_{2i} \cdot g([n-2i]T_c + \Delta T_c)\cos\left(\frac{\pi n}{2}\right) + \right.$$

$$\left. \sum_{i=0}^{M} f(i) \cdot c_{2i+1} \cdot g([n-2i-1]T_c + \Delta T_c)\sin\left(\frac{\pi n}{2}\right)\right] +$$

$$\cos(\theta)\left[-\sum_{i=0}^{M} f(i) \cdot c_{2i} \cdot g([n-2i]T_c + \Delta T_c)\sin\left(\frac{\pi n}{2}\right) + \right.$$

$$\left. \sum_{i=0}^{M} f(i) \cdot c_{2i+1} \cdot g([n-2i-1]T_c + \Delta T_c)\cos\left(\frac{\pi n}{2}\right)\right].$$

To understand the serial demodulation operation, the equations for the serial I and Q signals need to be simplified. First, the serial formatting function is rewritten as follows:

$$f(i) = (-1)^i = \cos(\pi i).$$

Next, the following trigonometric relationships are used:

$$\cos\left(\frac{\pi}{2}[n-2i]\right) = \cos\left(\frac{\pi n}{2}\right)\cos(\pi i) = -\sin\left(\frac{\pi}{2}[n-2i-1]\right),$$

and $$\sin\left(\frac{\pi}{2}[n-2i]\right) = \sin\left(\frac{\pi n}{2}\right)\cos(\pi i) = \cos\left(\frac{\pi}{2}[n-2i-1]\right).$$

Applying these trigonometric relationships to the serial I and Q signals, results in the following equations:

$$sx(n) = \cos(\theta)\left[\sum_{i=0}^{M} c_{2i} \cdot g([n-2i]T_c + \Delta T_c)\cos\left(\frac{\pi[n-2i]}{2}\right) + \right.$$

$$\left. \sum_{i=0}^{M} c_{2i+1} \cdot g([n-2i-1]T_c + \Delta T_c\cos\left(\frac{\pi[n-2i-1]}{2}\right)\right] -$$

$$\sin(\theta)\left[\sum_{i=0}^{M} c_{2i} \cdot g([n-2i]T_c + \Delta T_c)\sin\left(\frac{\pi[n-2i]}{2}\right) + \right.$$

$$\left. \sum_{i=0}^{M} c_{2i+1} \cdot g([n-2i-1]T_c + \Delta T_c)\sin\left(\frac{\pi[n-2i-1]}{2}\right)\right]$$

and $$sy(n) = -\sin(\theta)\left[\sum_{i=0}^{M} c_{2i} \cdot g([n-2i]T_c + \Delta T_c)\cos\left(\frac{\pi[n-2i]}{2}\right) + \right.$$

$$\left. \sum_{i=0}^{M} c_{2i+1} \cdot g\left([n-2i-1]T_c + \Delta T_c\cos\left(\frac{\pi[n-2i-1]}{2}\right)\right)\right] -$$

$$\cos(\theta)\left[\sum_{i=0}^{M} c_{2i} \cdot g([n-2i]T_c + \Delta T_c)\sin\left(\frac{\pi[n-2i]}{2}\right) + \right.$$

$$\left. \sum_{i=0}^{M} c_{2i+1} \cdot g([n-2i-1]T_c + \Delta T_c)\sin\left(\frac{\pi[n-2i-1]}{2}\right)\right].$$

Looking closely at the each of the summation terms, it may be seen that the even and odd chip summations could be combined to provide the following equations for the serial I and Q signals:

$$sx(n) = \cos(\theta)\left[\sum_{k=0}^{2M+1} c_k \cdot g([n-k]T_c + \Delta T_c)\cos\left(\frac{\pi[n-k]}{2}\right)\right] -$$

$$\sin(\theta)\left[\sum_{k=0}^{2M+1} c_k \cdot g([n-k]T_c + \Delta T_c)\sin\left(\frac{\pi[n-k]}{2}\right)\right]$$

and $$sy(n) = -\sin(\theta)\left[\sum_{k=0}^{2M+1} c_k \cdot g([n-k]T_c + \Delta T_c)\cos\left(\frac{\pi[n-k]}{2}\right)\right] -$$

$$\cos(\theta)\left[\sum_{k=0}^{2M+1} c_k \cdot g([n-k]T_c + \Delta T_c)\sin\left(\frac{\pi[n-k]}{2}\right)\right].$$

These equations for the serial I and Q signals show each signal is comprised of the autocorrelation function weighted by a cosine and sine response. By performing some basic operation, these equations may be rewritten as follows:

$$sx(n) = \cos\left(\theta - \frac{\pi\Delta T_c}{2}\right)\left[\sum_{k=0}^{2M+1} c_k \cdot g([n-k]T_c + \Delta T_c)\cos\left(\frac{\pi[n-k+\Delta T_c]}{2}\right)\right] -$$

$$\sin\left(\theta - \frac{\pi\Delta T_c}{2}\right)\left[\sum_{k=0}^{2M+1} c_k \cdot g([n-k]T_c + \Delta T_c)\sin\left(\frac{\pi[n-k+\Delta T_c]}{2}\right)\right]$$

and $$sy(n) = -\left(\theta - \frac{\pi\Delta T_c}{2}\right)\left[\sum_{k=0}^{2M+1} c_k \cdot g([n-k]T_c T_c + \Delta T_c)\cos\left(\frac{\pi[n-k+\Delta T_c]}{2}\right)\right] -$$

$$\sin\left(\theta - \frac{\pi\Delta T_c}{2}\right)\left[\sum_{k=0}^{2M+1} c_k \cdot g([n-k]T_c + \Delta T_c)\sin\left(\frac{\pi[n-k+\Delta T_c]}{2}\right)\right].$$

Rewriting the serial I and Q signals in this structure shows that the signals include a time shifted autocorrelation function, which is weighted by a time shifted cosine and sine function. The phase error term depends on the carrier phase error and the timing error.

The SYNC detection process, which is performed by SYNC detection algorithm 21 of FIG. 5, uses a spreading sequence with good autocorrelation properties along with a noncoherent detection algorithm. U.S. application Ser. No. 11/314,757, filed by the same inventor of the present application, discloses various noncoherent detection algorithms. This application is incorporated herein for its teachings of SYNC detection algorithms in its entirety.

The good autocorrelation properties of the spreading sequence minimize false detection, while the phase error term is removed by the noncoherent detection algorithm. The resulting SYNC detection correlation response is equal to the QBL-MSK autocorrelation function.

The SYNC detection process may also be used for time-of-arrival (TOA) measurements by curve fitting the QBL-MSK autocorrelation function. Since this operation uses a noncoherent detection algorithm, however, one is not able to apply the quadrature multiple-frequency ranging (QMFR) algorithm for separating out a multi-path signal within a 0.5 Tc chip period. As previously discussed, separation of the direct and multi-path components is required for QMFR operation by placing one component on the I signal and the other component on the Q signal using frequency changes.

To achieve this requirement, the signal structure needs to place the correlator output signals on only the I or Q side for no carrier phase error. Inserting zero carrier phase and zero time error into the serial I and Q equations results in the following correlator output signals:

$$Icor(n) = g(nT_c)\cos\left(\frac{\pi n}{2}\right)$$

and $$Qcor(n) = g(nT_c)\sin\left(\frac{\pi n}{2}\right).$$

Figure 9:
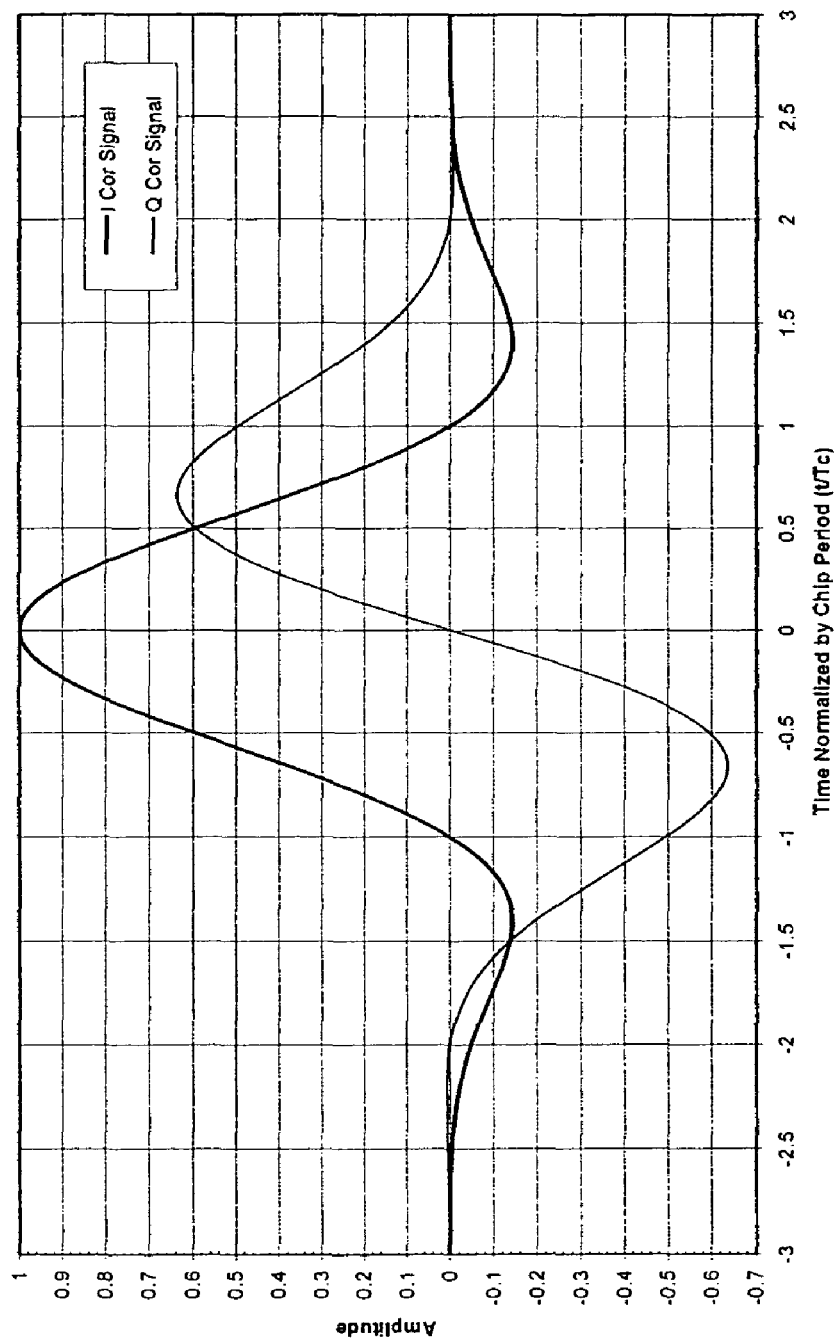
FIG. 9 includes a plot of the SQBL-MSK I output and a plot of the SQBL-MSK Q correlator output.

These signals are plotted in FIG. 9 without specifying the sampling points. Since the SQBL-MSK signal generates both I and Q correlator signals, SQBL-MSK cannot implement the QMFR algorithm.

QBL-MSK Demodulation

In order to overcome the I and Q correlator output problem associated with SQBL-MSK, QBL-MSK is used for the TOA spreading sequence. For QBL-MSK, the serial formatting operation in the modulator is turned OFF, resulting in f(i) being set equal to one. The resulting equations for the sampled I{$x_2(n)$} and Q{$y_2(n)$} signals out of the chip matched filters are as follows:

$$x_2(n) = \left[\sum_{i=0}^{M} c_{2i} \cdot g([n-2i]T_c + \Delta T_c)\right]$$

$$\cos(\theta) + \left[\sum_{i=0}^{M} c_{2i+1} \cdot g([n-2i-1]T_c + \Delta T_c)\right]\sin(\theta)$$

and $$y_2(n) = -\left[\sum_{i=0}^{M} c_{2i} \cdot g([n-2i]T_c + \Delta T_c)\right]$$

$$\sin(\theta) + \left[\sum_{i=0}^{M} c_{2i+1} \cdot g([n-2i-1]T_c + \Delta T_c)\right]\cos(\theta).$$

Examining these two equations closely, one can see that the cosine carrier phase error term is associated with the even chips on the I signal and the odd chips on the Q signal. Likewise, the sine carrier phase error term is associated with the odd chips on the I signal and the even chips on the Q signal.

Accordingly, to obtain the cosine carrier phase error components on the I side and the sine carrier phase error components on the Q side, the I correlator operates on the even samples of the I chip matched filter output and the odd samples of the Q chip matched filter output (see FIG. 4*a*). Likewise, the Q correlator operates on the inverted odd samples of the I chip matched filter output and the even samples of the Q chip matched filter output (see FIG. 4*b*) to obtain the sine carrier phase error components on the Q side. The exact same switching of chip matched filter outputs is done for each correlator spreading code shift (see FIGS. 4*c* and 4*d*). This requires two different switching algorithms to provide for even and odd spreading code shifts.

The I and Q correlator outputs are obtained based on the SYNC detection with chip timing error $\Delta T_C$, which is between plus or minus a half of a chip ($\pm 0.5 \cdot T_C$). The I(I cor) and Q(Q cor) signals with sample 0 defined as the SYNC detection point are given by the following equations:

$$I\ cor(k) = \sum_{i=0}^{M} c_{2i} \cdot x(k+2i) + c_{2i+1} \cdot y(k+2i+1)$$

and $$Q\ cor(k) = \sum_{i=0}^{M} c_{2i} \cdot y(k+2i) - c_{2i+1} \cdot x(k+2i+1).$$

From FIG. 7, the QBL-MSK autocorrelation function is nonzero for sample times less than 2.5 chip periods. Using this information for the autocorrelation function, the I and Q correlation values about the SYNC detection point (m=−3, −2, −1, 0, 1, 2, 3) are:

$$I\ cor(m) =$$

$$\cos(\theta)\left[\sum_{i=0}^{2M+1}\sum_{k=-1}^{1}[(c_{2i} \cdot c_{2i+1+k} + c_{2i+1} \cdot c_{2i+1+k}) \cdot g(-[m+k]T_c + \Delta T_c)]\right] +$$

$$\sin(\theta)\left[\sum_{i=0}^{2M+1}\sum_{k=-1}^{1}[(c_{2i} \cdot c_{2i+1+k} - c_{2i+1} \cdot c_{2i+k}) \cdot g(-[m+k]T_c + \Delta T_c)]\right]$$

and $$Q\ cor(m) =$$

$$-\sin(\theta)\left[\sum_{i=0}^{2M+1}\sum_{k=-1}^{1}[(c_{2i} \cdot c_{2i+1+k} + c_{2i+1} \cdot c_{2i+1+k}) \cdot g(-[m+k]T_c + \Delta T_c)]\right] +$$

$$\cos(\theta)\left[\sum_{i=0}^{2M+1}\sum_{k=-1}^{1}[(c_{2i} \cdot c_{2i+1+k} - c_{2i+1} \cdot c_{2i+k}) \cdot g(-[m+k]T_c + \Delta T_c)]\right].$$

The TOA spreading sequence needs to have good autocorrelation properties across the entire spreading sequence and between the even and odd chips. Using two spreading sequences with good autocorrelation and cross-correlation properties to generate the even and odd chip spreading sequences is one method of achieving the needed spreading sequence properties. Assuming the desired spreading code properties are achieved, the I and Q correlator output signals about the SYNC detection point (m=−3, −2, −1, 0, 1, 2, 3) are:

$$I\,cor(m) = [2M+2] \cdot \cos(\theta) \cdot g(-[m+k]T_c + \Delta T_c)$$

and $$Q\,cor(m) = [2M+2] \cdot \sin(\theta) \cdot g(-[m+k]T_c + \Delta T_c).$$

The results for the I and Q correlator outputs show that, for zero carrier phase error, the correlation response is only on the I correlator output. This key feature is needed to implement the QMFR algorithm.

As discussed before, good correlation properties of the TOA spreading sequence are required to maximize performance. Typically, these good correlation properties are achieved by using odd length spreading sequences. If an odd length TOA spreading sequence is used with more than one repeated sequence in the message, the correlation response for zero carrier phase error is shifted between the I and Q correlator outputs. For the odd number TOA sequences (first, third, fifth, and so on), the correlation response for zero carrier phase error is mapped on the I correlator output. For the even number TOA sequences (second, fourth, sixth, and so on), the correlation response for zero carrier phase error is mapped on the Q correlator output. Although the correlation response shifts between I and Q, the properties needed for the QMFR algorithm are achieved by the present invention.

Another approach includes providing a new mapping procedure for the even numbered TOA sequences within a message. This procedure of mapping only the even numbered TOA sequences would result in the correlation response for zero carrier phase error being on the I correlator output.

TOA Message Waveform Structure

Figure 10:
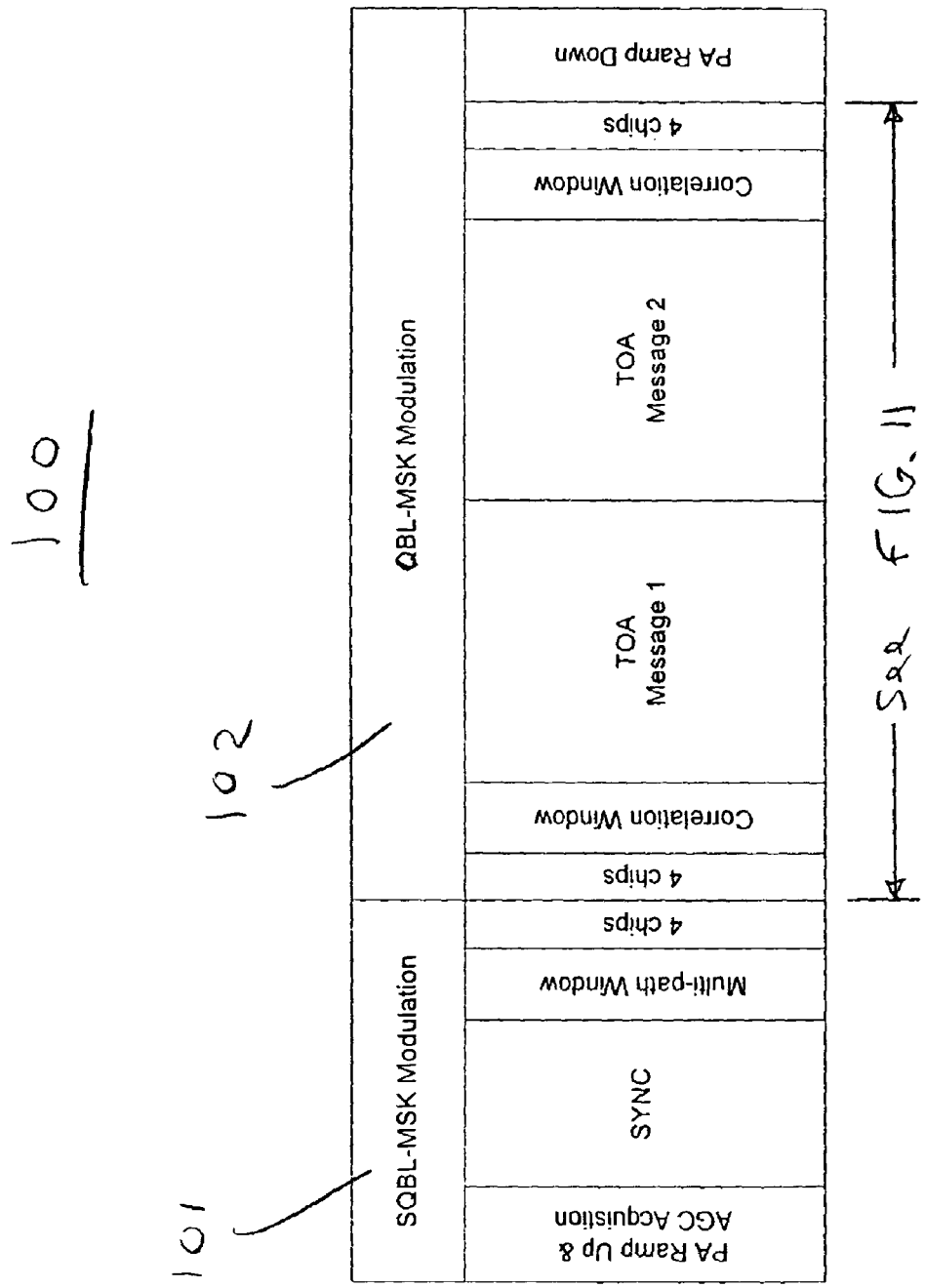
FIG. 10 is a waveform structure diagram of a data packet including TOA messages, in accordance with an embodiment of the present invention.

FIG. 10 shows one embodiment of a TOA packet waveform structure, which includes two TOA sequence messages using the same repetitive spreading TOA sequence. As shown, TOA message 1 and TOA message 2 are formatted using QBL-MSK modulation (designated as 102 in FIG. 10). Four chips are used to separate the transition between the two different spreading modulations. The correlation window equals the number of samples around the SYNC detection point in either the plus or minus direction. The SYNC message, as shown, is part of the SQBL-MSK modulation formatting, which is designated as 101.

Figure 11:
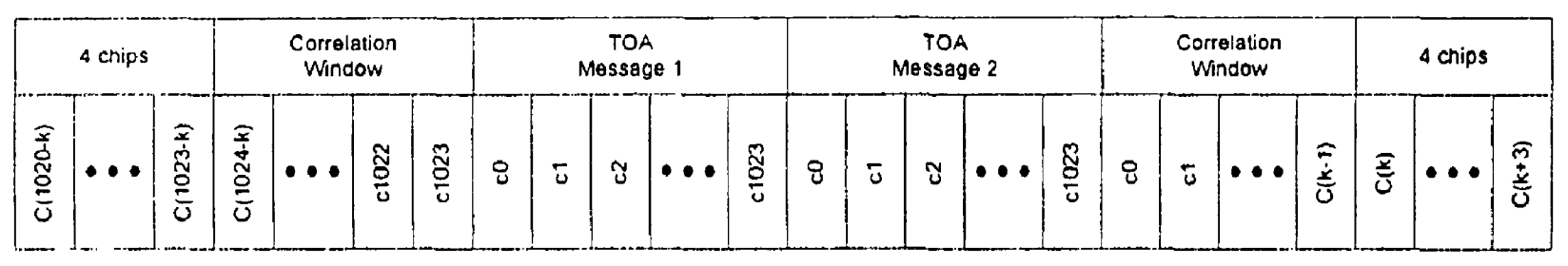

FIG. 11 shows the TOA spreading sequence structure of FIG. 10 in more detail. This structure, in the example shown, uses a repetitive 1023 spreading code and a correlation window equal to k. The four chips are used to separate the transition between the two different spreading modulations.

The following applications filed on Dec. 21, 2005 by the inventor of the present application are incorporated herein in their entireties:

Adaptive Synchronization Enhancement Technique For Serial Modulated Waveforms application Ser. No. 11/314,757.

Enhanced QPSK Or DQPSK Data Demodulation For Direct Sequence Spreading (DSS) System Waveforms Using Orthogonal Or Near-Orthogonal Spreading Sequences application Ser. No. 11/314,123.

Although the invention is illustrated and described herein with reference to specific embodiments, the invention is not intended to be limited to the details shown. Rather, various modifications may be made in the details within the scope and range of equivalents of the claims and without departing from the invention. For example, although QBL-MSK is selected as an exemplary modulation waveform, it is understood that other constant or near constant envelope modulation waveforms, such as Offset Quadrature Phase Shift Keying (OQPSK), Minimum Shift Keying (MSK), Gaussian MSK, Tamed Frequency Modulation (TFM), Intersymbol Jitter Free Offset Quadrature Phase Shift Keying (IJF-OQPSK), Raised Cosine Filtered Offset Quadrature Phase Shift Keying (RC-OQPSK), and bandwidth efficient Continuous Phase Modulation (CPM) methods may be used for the modulation. Non-constant envelope modulation waveforms, such as BPSK and filtered BPSK, may also be used for the modulation.

What is claimed:

1. A transmitter configured to transmit a time of arrival (TOA) message to a receiver applying a quadrature multiple frequency ranging (QMFR) algorithm for separating multiple path signal components, the transmitter comprising:
 a modulator for applying a spreading sequence to the TOA message to generate a quasi-band limited minimum shift keyed (QBL-MSK) signal,
 a serial formatter for applying a serial formatting operation to the QBL-MSK signal to generate a serial quasi-band limited minimum shift keyed (SQBL-MSK) signal, and
 a switch for disabling the serial formatter, during a time the TOA message is being transmitted to the receiver.

2. The transmitter of claim 1 including
 a transmitter section for transmitting the SQBL-MSK signal or the QBL-MSK signal, and
 the switch includes a processing module for enabling or disabling the serial formatter,
 wherein when the switch enables the serial formatter, the transmitter section is configured to transmit the SQBL-MSK signal, and
 when the switch disables the serial formatter, the transmitter section is configured to transmit the QBL-MSK signal.

3. The transmitter of claim 1 wherein
 the switch is configured for disabling the serial formatter during a time the TOA message or a power amplifier (PA) ramp down message is being transmitted to the receiver, and
 the switch is configured for enabling the serial formatter during a time a PA ramp up message, an automatic gain control (AGC) message, a multipath window message, a synchronization message, or a data message is being transmitted to the receiver.

4. The transmitter of claim 1 wherein
 a structure for the QBL-MSK signal and the SQBL-MSK signal includes the following $$s(t) = \left[\sum_{i=0}^{M} f(i) \cdot c_{2i} \cdot p(t - 2iT_c)\right] \cos(2\pi f_o t) + \left[\sum_{i=0}^{M} f(i) \cdot c_{2i+1} \cdot p(t - [2i+1]T_c)\right] \sin(2\pi f_o t)$$

where:
$T_c$ is the chip period,
$c_i$ is the chip value
M+1 is the number of chips,
p(t) is the QBL pulse-shaping function, $f_o$ is the center frequency, $$p(t) = \begin{cases} \left[\dfrac{\sin\left(\dfrac{\pi t}{2T_c}\right)}{\left(\dfrac{\pi t}{2T_c}\right)}\right]^3 ; & -2T_c \leq t \leq 2T_c \\ 0; & \text{elsewhere.} \end{cases}$$

and $$f(i) = \begin{cases} (-1)^i; & \text{for } SQBL-MSK \\ 1; & \text{for } QBL-MSK. \end{cases}$$

5. A method of separating multiple path signal components between a receiver and a transmitter comprising the steps of:
(a) modulating, by a transmitter, a data packet including a time of arrival (TOA) message using a spreading sequence;
(b) formatting, by the transmitter, the TOA message using quasi-band limited minimum shift keyed (QBL-MSK) modulation;
(c) formatting, by the transmitter, other portions of the data packet using serial quasi-band limited minimum shift keyed (QBL-MSK) modulation; and
(d) transmitting the TOA message modulated by quasi-band limited minimum shift keyed (QBL-MSK) and the other portions of the data packet modulated by serial quasi-band limited minimum shift keyed (QBL-MSK),
wherein the TOA message is configured for a receiver to separate multiple path signal components.

6. The method of claim 5 including the following step:
switching a serial formatter ON/OFF to enable or disable the serial formatter,
wherein when the serial formatter is switched OFF, the TOA message is modulated by QBL-MSK, and
when the serial formatter is switched ON, the other portions of the data packet are modulated by SQBL-MSK.

7. The method of claim 5 wherein
the step of formatting the other portions of the data packet includes formatting a PA ramp up message, an automatic gain control (AGC) message, a multipath window message, a synchronization message, or a data message using SQBL-MSK modulation.

* * * * *